(12) United States Patent
Palvölgyi

(10) Patent No.: US 7,614,854 B2
(45) Date of Patent: Nov. 10, 2009

(54) MULTICHAMBER TANK FOR MOTOR VEHICLES

(75) Inventor: Sandor Palvölgyi, Gleisdorf (AT)

(73) Assignee: Tesma Motoren-und Getriebetechnick GmbH, Sinabelkirchen (AT)

( * ) Notice: Subject to any disclaimer, the term of this patent is extended or adjusted under 35 U.S.C. 154(b) by 757 days.

(21) Appl. No.: 11/216,989

(22) Filed: Aug. 30, 2005

(65) Prior Publication Data

US 2007/0189906 A1 Aug. 16, 2007

(30) Foreign Application Priority Data

Aug. 31, 2004 (AT) .............................. GM638/2004

(51) Int. Cl.
*F04B 49/00* (2006.01)
*B65B 1/34* (2006.01)
(52) U.S. Cl. ............................. 417/36; 417/40; 141/126
(58) Field of Classification Search .................. 417/36, 417/40; 141/126
See application file for complete search history.

(56) References Cited

U.S. PATENT DOCUMENTS

| 4,244,385 | A | * | 1/1981 | Hotine | 137/1 |
| 5,983,932 | A | * | 11/1999 | Wagner et al. | 137/587 |
| 6,609,537 | B1 | * | 8/2003 | Horrer et al. | 137/587 |
| 6,955,158 | B2 | * | 10/2005 | Rumpf | 123/514 |
| 7,204,238 | B2 | * | 4/2007 | Pozgainer et al. | 123/519 |

* cited by examiner

*Primary Examiner*—Charles G Freay
(74) *Attorney, Agent, or Firm*—Bachman & LaPointe, P.C.

(57) ABSTRACT

A multichamber tank for motor vehicles comprises two chambers (4, 5) connected via a constricted region (6) located high up in the chambers, a first chamber (4) having a filler neck (2), and a line (13) bridging the constriction forming the connection to a second chamber (5). In order that both chambers are filled at approximately the same speed during filling-up through the filler neck (2), a pump (11) designed for level equalization during filling-up and driven by an electric motor (12) is provided in the line (13), and a level sensor (17, 18) is provided in each of the two chambers (4, 5), the output signals of which sensors are available to a control unit (14) which controls the electric motor (12) of the pump (11).

7 Claims, 3 Drawing Sheets

MULTICHAMBER TANK FOR MOTOR VEHICLES

BACKGROUND OF THE INVENTION

The invention relates to a multichamber tank for motor vehicles, the chambers of which meet via a constricted region located high up, a first chamber having a filler neck, and a line bridging the constriction forming the connection to a second chamber. Such fuel tanks are found in motor vehicles with rear-wheel drive, for safety reasons in front of the rear axle, and are shaped in such a way that sufficient space remains free for passage of the propeller shaft leading to the rear axle. This accounts for their shape, because of which they are also designated as saddle tanks.

This shape requires special precautions for drawing in and delivering the fuel to the engine because a single feed pump unit in a single chamber is clearly inadequate. For this purpose, either a number of feed pump units are necessary, one in each chamber, or only one in one chamber and a sucking jet pump in the second chamber. An example of the first arrangement is known from DE 102 08 788 A1, an example of the second arrangement from DE 196 27 578 A1. The filling-up of such containers is dependent on the liquid level in the chamber with the filler neck at some time reaching the vertex of the saddle and the fuel thus passing into the second chamber. If the vertex is very high up, a connecting pipe located low down may additionally be provided between the two chambers; however, this pipe causes great difficulties during tank and/or propeller shaft installation. Another solution consists in equipping both chambers with a filler neck, one on each side of the vehicle.

The problem to be solved consequently consists in level equalization during filling-up. The arrangement between the two chambers of a connecting line bridging the constriction, which makes use of the siphon effect known to every cellarman, is known from WO 02/38409 A1. This line will bring about level equalization between the two chambers without external influence if it contains no air. For this, however, its cross section must not be too large and it must be ensured that the liquid level in the two chambers never falls below the respective opening of the pipe. The latter is achieved according to WO 02/38409 A1 by means of a sucking jet pump, which keeps the connecting line always filled with liquid. However, the sucking jet pump has to be fed from the fuel pump, which has to be taken into account in the design of the latter. The cross section of the connecting line is in any case too small to bring about a level equalization which keeps up with the liquid flow from the gas pump nozzle during filling-up. The two liquid flow rates differ greatly.

It is consequently an object of the invention to equip a fuel tank of the generic type in such a way that both chambers are filled at approximately the same speed during filling-up through a filler neck.

SUMMARY OF THE INVENTION

According to the invention, this is achieved by virtue of the fact that a pump designed for level equalization during filling-up and driven by an electric motor is provided in the line, and that a level sensor is provided in each of the two chambers, the output signals of which sensors are available to a control unit which controls the electric motor of the pump. The pump can be designed especially for this purpose, that is without compromise and in most cases for only one delivery direction. For the same reason, its electric motor does not have to be designed for continuous duty either. As a result, the unit is relatively small. At least one level sensor has to be provided anyway, so that the additional expenditure is kept within limits.

The use of the pump for only one purpose makes it possible to select a turbopump with a large mass flow and a small delivery head, for example a correspondingly designed centrifugal pump, a semi-axial-flow pump or even an axial-flow pump or screw pump. Accordingly, the connecting line also has a large cross section, so that the delivery flow moved by the pump is not appreciably smaller than that of the gas pump nozzle. The pump with its electric motor is preferably placed low down in the first chamber, so that the connecting line is on its delivery side. The pump does not have to draw, therefore, and can deliver fully immediately after switching-on.

In pursuance of the inventive idea, a sensor is provided on or at the outer end of the filler neck, which sensor indicates a filling-up state to the control unit, whereupon the latter enables start-up of the pump. This ensures first of all that the pump can be switched on only during filling-up.

The control unit is preferably designed in such a way that it switches the pump on when the signal from the level sensor in the first chamber reaches a first, lower threshold value and switches it off again when the signal from the level sensor in the first chamber reaches a second, upper threshold value. The lower threshold value is selected in such a way that the pump is switched on only when it is already filled.

In a development of the invention, the control unit compares the signals from the two level sensors after switching-off and switches the pump on again if the signal from the level sensor in the first chamber is greater than the signal from the level sensor in the second chamber. If the delivery flow of the pump is smaller than that of the gas pump nozzle, a final level equalization between the two chambers thus takes place, preferably after a suitably selected time interval.

BRIEF DESCRIPTION OF THE DRAWINGS

The invention is described and explained below with the aid of diagrams, in which:F

DETAILED DESCRIPTION

Figure 1:
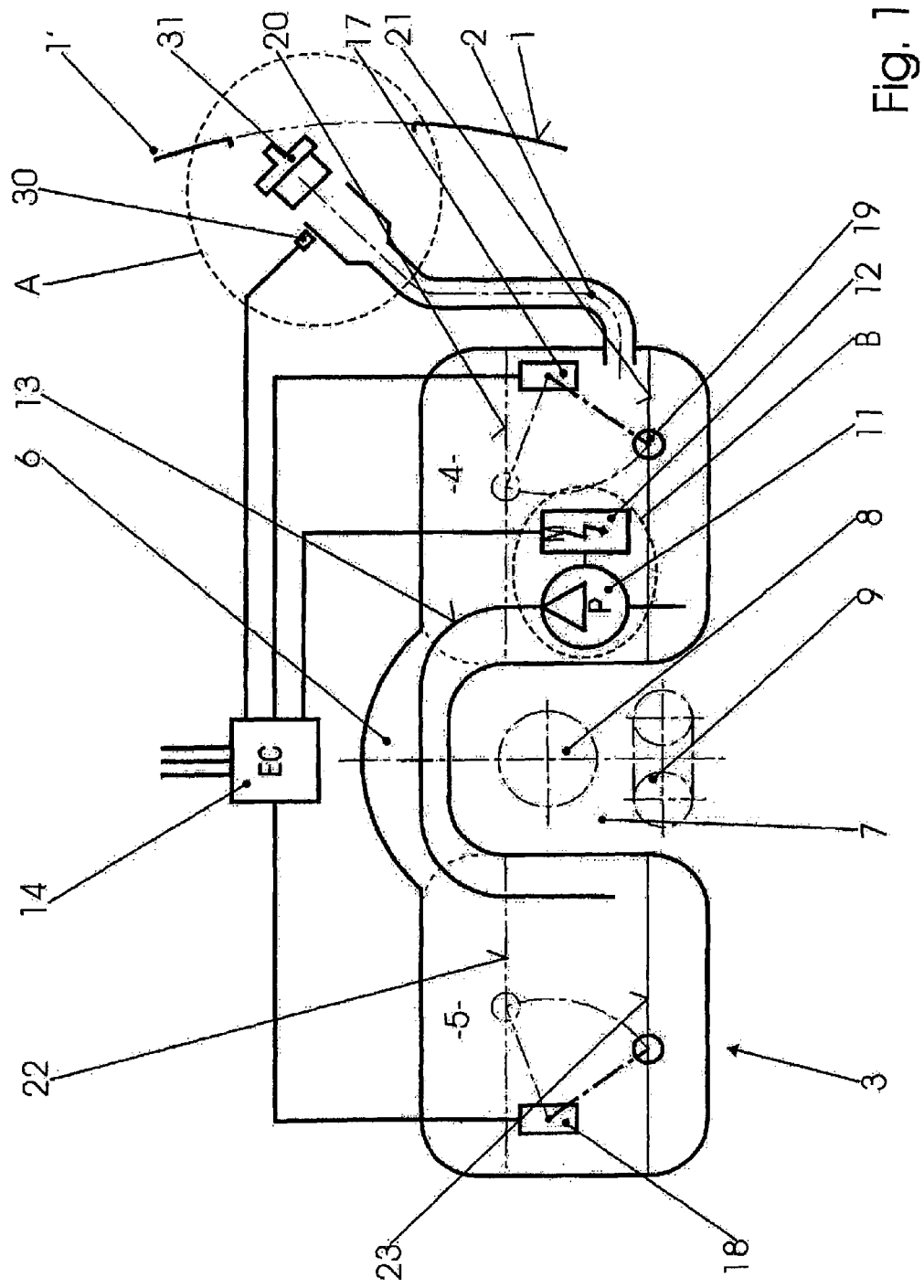
FIG. 1 shows a diagrammatic section through a tank according to the invention in the transverse direction of the vehicle (in a YZ plane)

In FIG. 1, the side wall 1 of a motor vehicle is only indicated. A filler pipe 2 for filling-up, which leads into a tank designated as a whole by 3, is accessible through an opening 1' in the side wall 1. The tank consists of two chambers 4, 5, one on the right side of the motor vehicle and one on the left, and a raised and constricted region 6 between them. A free space 7, which provides space for a propeller shaft 8 and if appropriate an exhaust 9 as well, is thus created below the region 6 and between the two chambers 4, 5.

A special pump 11 with an electric drive motor 12 is located as low down as possible inside the right chamber 4. This pump 11 serves only for level equalization during filling-up. For normal operation, a separate installation of pumps and if appropriate sucking jet pumps is provided, which conveys the fuel to the internal combustion engine of the vehicle. This does not constitute subject matter of the invention and can be of any type of construction. For its special purpose, the pump 11 is designed for a large delivery rate with a small delivery head and delivers into a connecting line 13. This correspondingly has a large cross section. By virtue of this, the level equalization between the two chambers can take place during filling-up at approximately the same speed as that at which the gas pump nozzle delivers.

The pump 11 with motor 12 is supplied with power and switched on and off by a control unit 14. For this, the control unit 14 requires input signals from two level sensors 17, 18 and from a sensor for indicating a filling-up state. The sensors can be of any type of construction; here, they each have a float 19 and serve mainly for level indication in the vehicle. For control of the pump 11, they have to provide the control unit 14 with a signal only when the maximum levels 20, 22 and the minimum levels 21, 23 in the two chambers 4, 5 are reached.

Figure 3:
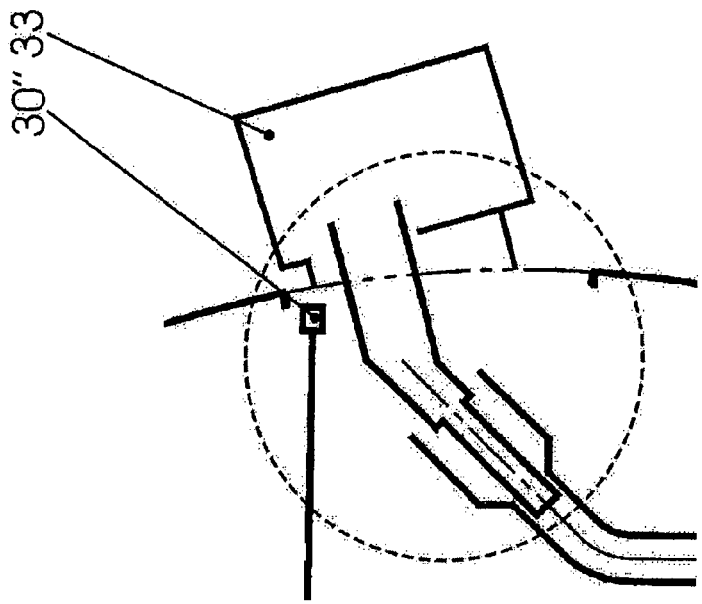
FIG. 3 shows a second variant of detail A.
Figure 2:
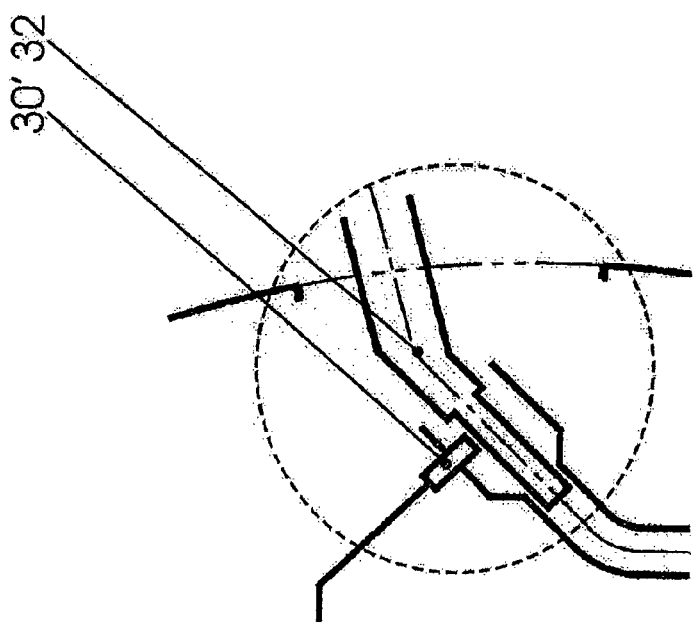
FIG. 2 shows a first variant of detail A.

Lastly, a further sensor 30 is present, which indicates to the control unit 14 when filling-up is taking place. Only then is it possible for the pump 11 to be switched on. In FIG. 1, the sensor 30 is an inductive or capacitive sensor, for example, which indicates that the tank cap 31 has been removed. In FIG. 2, the sensor 30' is a similar sensor. This indicates that the mouthpiece 32 of the gas pump nozzle has been introduced into the filler pipe 2. In FIG. 3, the sensor 30" is a contact sensor or movement sensor, which indicates opening of the tank flap 33.

Figure 4:
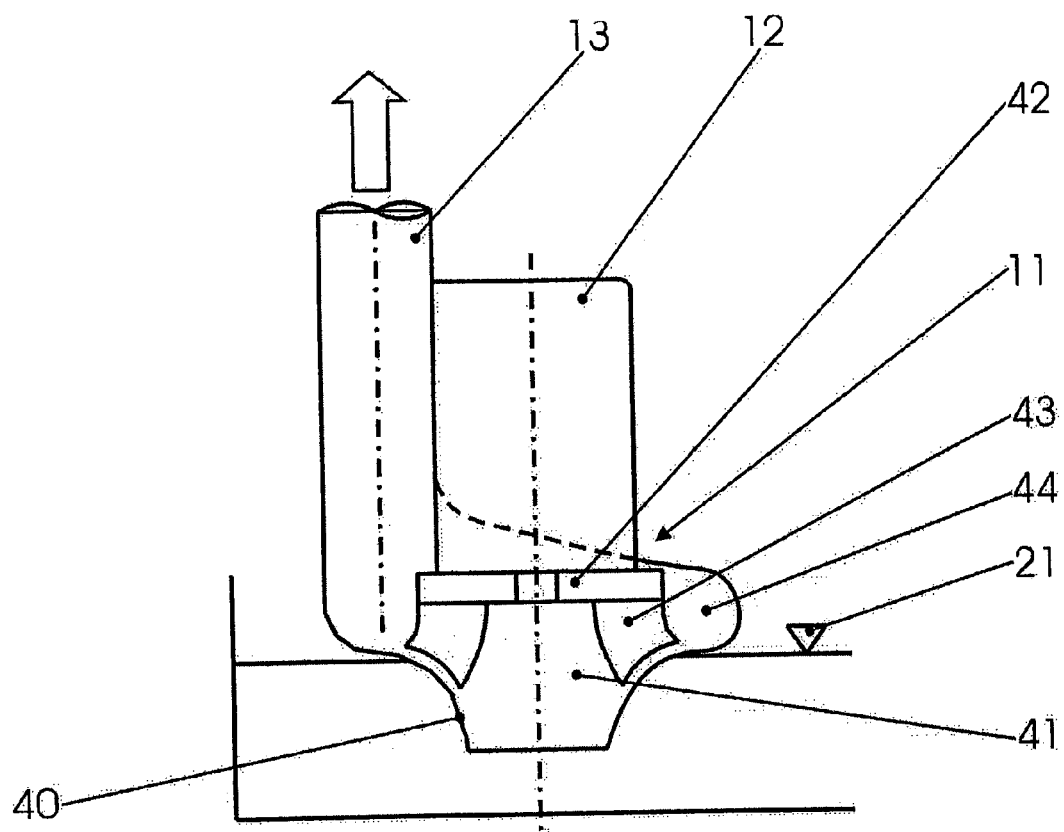
FIG. 4 shows detail B in FIG. 1.

FIG. 4 shows another illustrative embodiment of a pump, which is designed for a large delivery rate at low pressure. It is a unit with a vertical axis consisting of pump and motor, preferably a canned pump or a motor pump with a flowed-through motor. At the lower end of the pump 11 is a suction pipe 40, which widens into a pump chamber 41. A rotor 42 with semi-axial blades 43 rotates in this chamber. These blades extend mainly in the axial direction; they are only short in the radial direction. They deliver into a spiral housing 44, which is followed by the connecting line 13. The flow-through cross section of the pump 11 and of the connecting line 13 is relatively large so as to allow a large delivery flow. The pump unit is arranged so low down in the chamber 4 that the rotor 42 is still submerged at minimum fuel level 21, so that the pump starts to deliver immediately when switched on without drawing.

The pump 11 can be switched on when the sensor 30 first of all indicates a filling-up state. It is switched on when the signal from the level sensor 17 in the first chamber 4 reaches a first, lower threshold value 21 or (if the tank is being topped up early) when the level sensor detects a rise in level. It is switched off again when the signal from the level sensor 17 in the first chamber reaches a second, upper threshold value 20. Provision can also be made for the pump to be switched on again briefly after a certain time interval after the pump has been switched off in order to equalize the levels fully. This is advisable if the delivery flow of the gas pump nozzle is greater than that of the pump.

The invention claimed is:

1. A multichamber tank for motor vehicles, comprises first and second chambers (4, 5) connected together by a constricted region (6) located in an upper region of the chambers, the first chamber (4) has a filler neck (2) and a line (13) bridging the constriction forming the connection to the second chamber (5), a pump (11) designed for level equalization in the chambers is provided in the line (13), an electric motor (12) drives the pump, and a level sensor means (17, 18) is provided in each of the two chambers (4, 5) for generating output signals to a control unit (14) which controls the electric motor (12) of the pump (11) wherein a further sensor means (30; 30'; 30") is provided on or at the outer end of the filler neck (2) for indicating a filling-up state to the control unit (14) which enables start-up of the pump (11).

2. The multichamber tank as claimed in claim 1, wherein the pump (11) is a turbopump.

3. The multichamber tank as claimed in claim 1, wherein the pump (11) is located inside the first chamber (4).

4. The multichamber tank as claimed in claim 1, wherein the control unit (14) switches the pump on when the signal from the level sensor means (17) in the first chamber (4) reaches a first, lower threshold value (21) and switches it off again when the signal from the level sensor means (17) in the first chamber (4) reaches a second, upper threshold value (20).

5. The multichamber tank as claimed in claim 1, wherein the control unit (14) compares the signals from the level sensor means (17, 18) in each chamber after switching off the pump (11) and switches the pump (11) on again if the signal from the level sensor means (17) in the first chamber (4) is greater than the signal from the level sensor means (18) in the second chamber (5).

6. The multichamber tank as claimed in claim 5, wherein the comparison of the signals from the level sensors (17, 18) in each chamber takes place after a predetermined time interval.

7. The multichamber tank as claimed in claim 4, wherein contents of the multichamber tank is determined by the control unit (14) for display in the vehicle from the signals of the level sensors (17, 18) in each chamber.

* * * * *

UNITED STATES PATENT AND TRADEMARK OFFICE
CERTIFICATE OF CORRECTION

PATENT NO. : 7,614,854 B2
APPLICATION NO. : 11/216989
DATED : November 10, 2009
INVENTOR(S) : Sandor Palvölgyi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Nineteenth Day of October, 2010

David J. Kappos
*Director of the United States Patent and Trademark Office*